United States Patent [19]

Ho

[11] Patent Number: 5,307,758
[45] Date of Patent: May 3, 1994

[54] PORTABLE PET HOUSE

[76] Inventor: Ying-Kuan Ho, No. 22, Alley 18, Lane 75, An Ping Road, Tainan, Taiwan

[21] Appl. No.: 104,634

[22] Filed: Aug. 11, 1993

[51] Int. Cl.⁵ ............................................. A01K 31/06
[52] U.S. Cl. .................................................... 119/19
[58] Field of Search ...................... 119/15, 17, 18, 19; 217/324; 190/113, 114

[56] References Cited

U.S. PATENT DOCUMENTS

| | | | |
|---|---|---|---|
| 1,137,579 | 4/1915 | Cohn | 190/114 X |
| 1,512,549 | 10/1924 | Labadie et al. | 190/114 |
| 3,304,913 | 2/1967 | Nesher | 119/15 |
| 4,484,540 | 11/1984 | Yamamoto | 119/19 |
| 4,529,069 | 7/1985 | March | 190/114 |

Primary Examiner—Thomas Price
Attorney, Agent, or Firm—Bacon & Thomas

[57] ABSTRACT

A portable pet house includes a room for accommodating pets, a pair of flaps and a pair of panels extended upward from the upper portion of the pet house, each of the flaps has a handle and a pair of locks, a ring disposed in one of the handles and a latch disposed in the other of the handles for engaging with the ring so as to couple the flaps together, an ear is extended upward from each of the panels and has a puncture formed in the middle portion for engaging with the locks so as to secure the panels to the flaps.

4 Claims, 8 Drawing Sheets

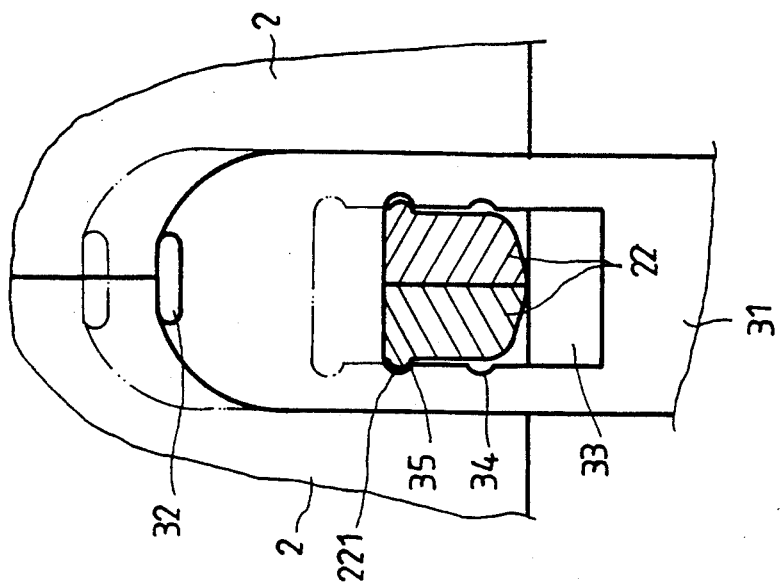
FIG 6
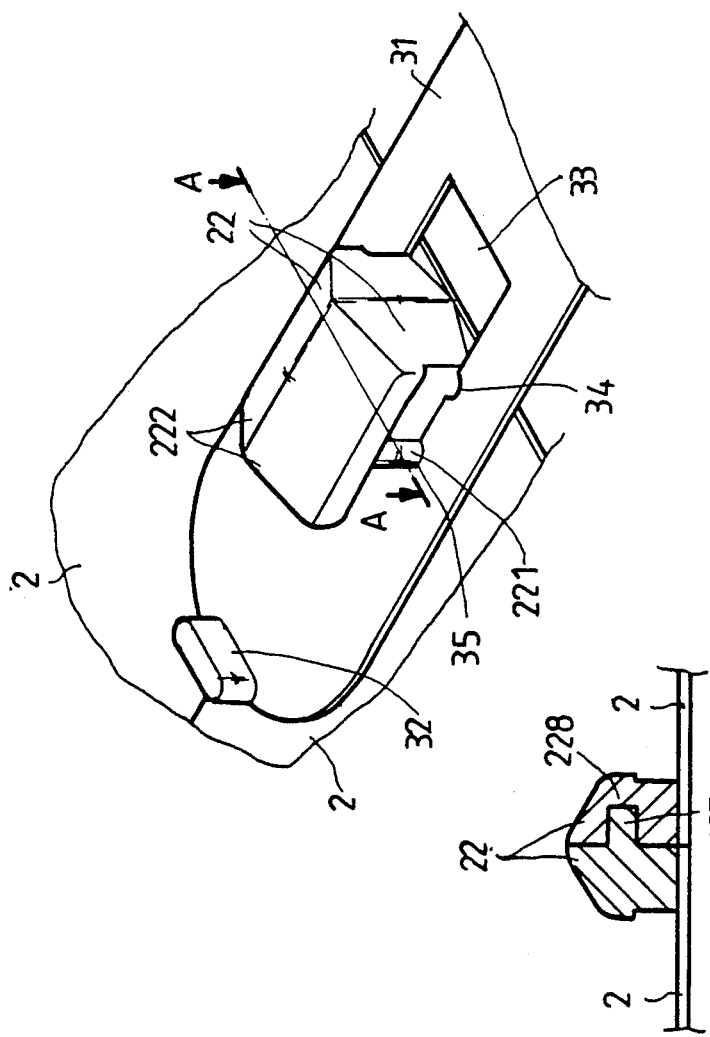
FIG 5
FIG 5A

PORTABLE PET HOUSE

BACKGROUND OF THE INVENTION

1. Field of the Invention

The present invention relates to a pet house, and more particularly to a portable pet house.

2. Description of the Prior Art

Raising pets has become more and more popular, however, typical pet houses are not suitable for portable purposes. In addition, it is very difficult to feed the pets with water.

The present invention has arisen to mitigate and/or obviate the afore-described disadvantages of the conventional pet houses.

SUMMARY OF THE INVENTION

The primary objective of the present invention is to provide a portable pet house which is suitable for transportation purposes.

In accordance with one aspect of the invention, there is provided a portable pet house comprising a body including a pair of flaps and a pair of panels extended upward therefrom, the body including a hollow interior having four corners, a first rib formed in each of the corners, a shoulder formed in a lower portion of a peripheral portion thereof for engaging with the first ribs of another pet house, the flaps each including a handle and a pair of lock means provided in an upper portion thereof, a ring disposed in a first of the handles of the flaps, a latch disposed in a second of the handles for engaging with the ring, a lid engaged in the latch, a bolt engaged in the ring and the latch and engaged with the lid for coupling the ring and the latch together, the bolt including a tapered end having a slit formed therein for engaging with the lid, each of the lock means including a second rib formed in a lateral portion thereof and a cap formed in an upper portion thereof, each of the panels including an ear extended upward therefrom, a puncture formed in each of the ear for engaging with the lock means respectively, and at least one notch formed in the puncture for engaging with the second rib so as to secure the panels to the flaps.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 5 is a partial perspective view of the pet house;

FIG. 5A is a cross sectional view taken along lines A—A of FIG. 5;

FIG. 6 is a schematic view illustrating the operations of the elements as shown in FIG. 5;

DETAILED DESCRIPTION OF THE PREFERRED EMBODIMENT

Figures 1, 1A:
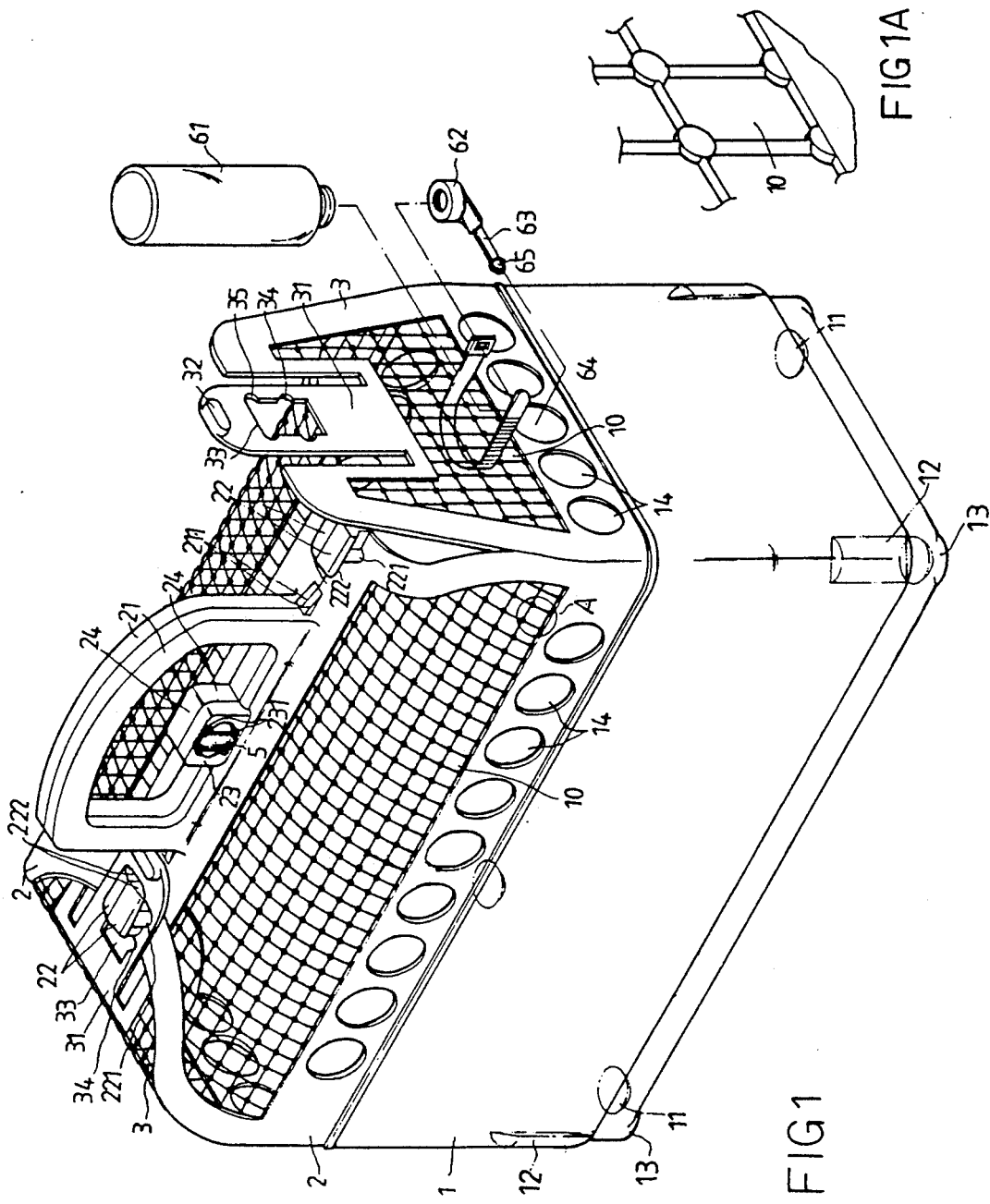
FIG. 1 is a partial exploded view of a portable pet house in accordance with the present invention.
FIG. 1A is an enlarged view illustrating part of the pet house.
Figure 2:
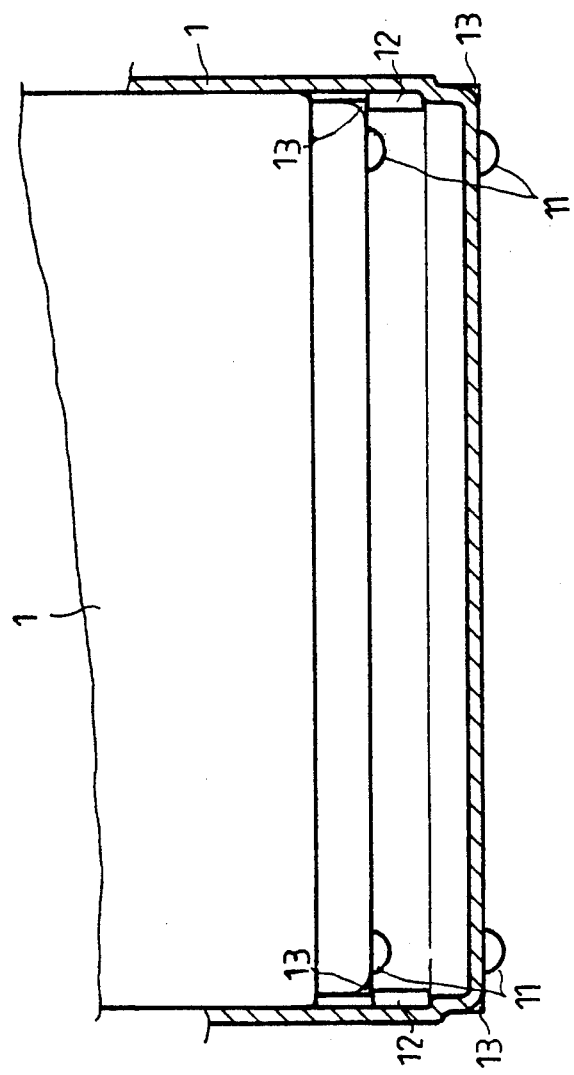
FIG. 2 is a partial cross sectional view illustrating two of the pet houses stacked together.

Referring to the drawings, and initially to FIGS. 1 and 1A, a portable pet house in accordance with the present invention comprises a body 1 for accommodating pets, the body 1 is preferably made by plastic materials and including a pair of flaps 2 and a pair of panels 3 extended upward therefrom and each having a plurality of holes 14 and a plurality of openings 10 formed therein, a feeder 61 attached to the body 1 for feeding the pets with water, four pads 11 provided in the bottom of the body 1, the body 1 including a hollow interior having four corners each having a rib 12 formed thereon, a depression 13 formed in the outer peripheral portion of the lower portion of the body 1, the ribs 12 of one pet house are engaged with the depression 13 of another pet house when the two pet houses are stacked with each other, as shown in FIG. 2, this is excellent for transportation and for storing purposes.

Figure 4:
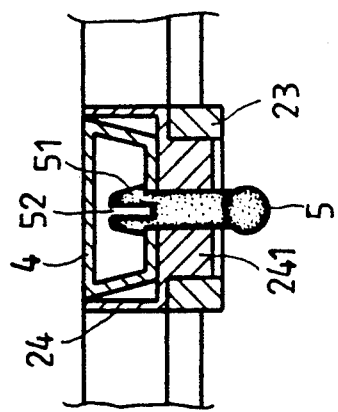
FIG. 4 is a cross sectional of the latching means.
Figure 3:
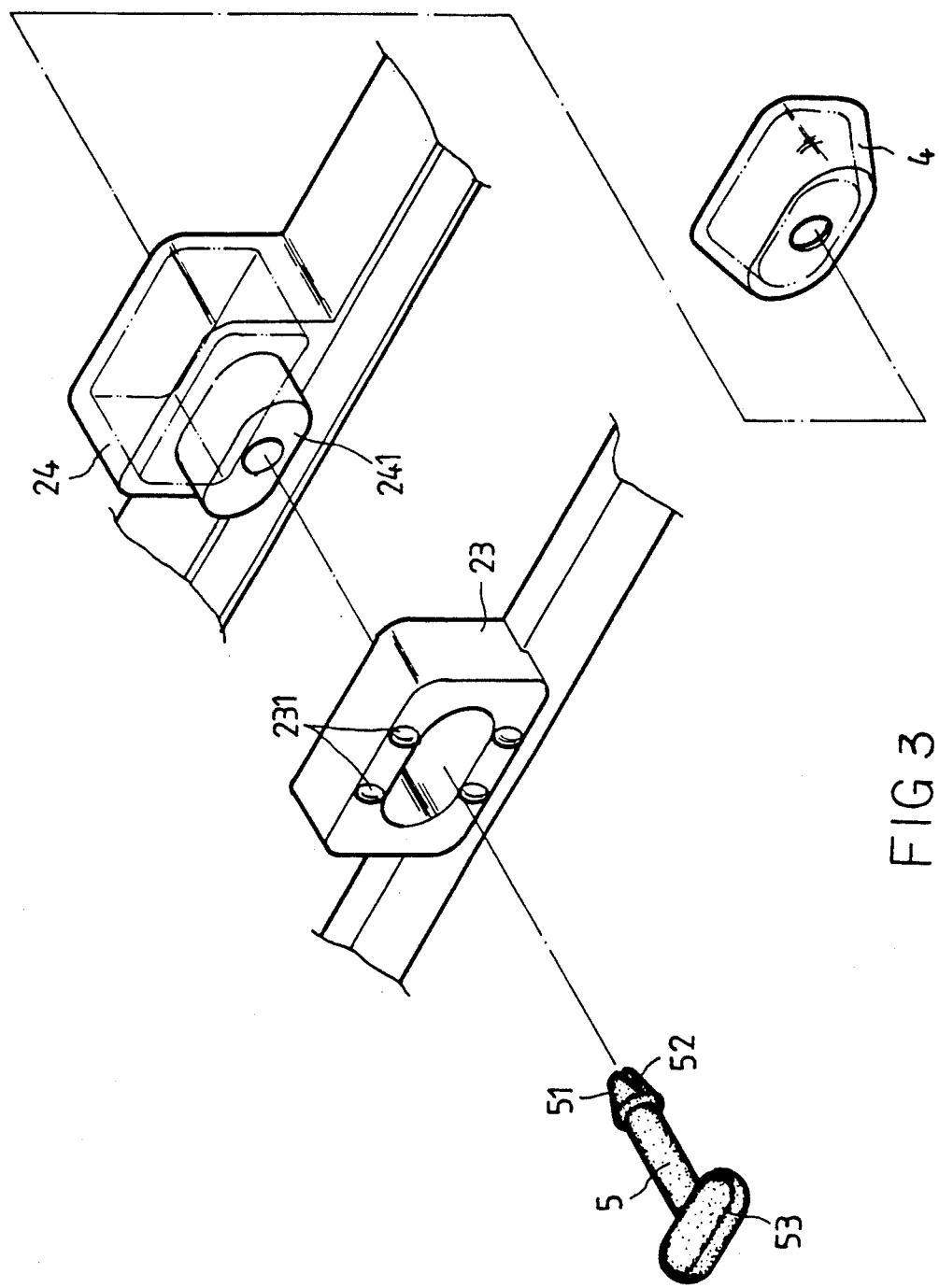
FIG. 3 is a partial exploded view of the latching means of the pet house.
Figure 8:
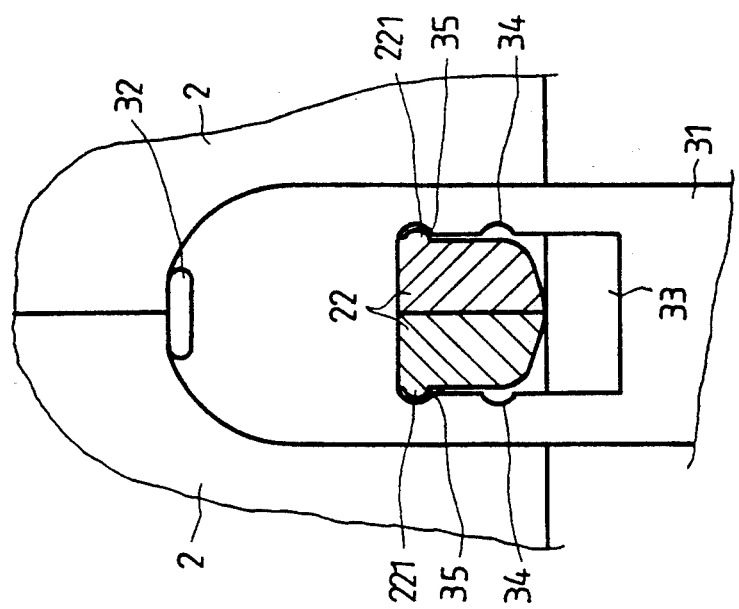
FIGS. 7 and 8 are partial plane views similar to FIG. 6.
Figure 7:
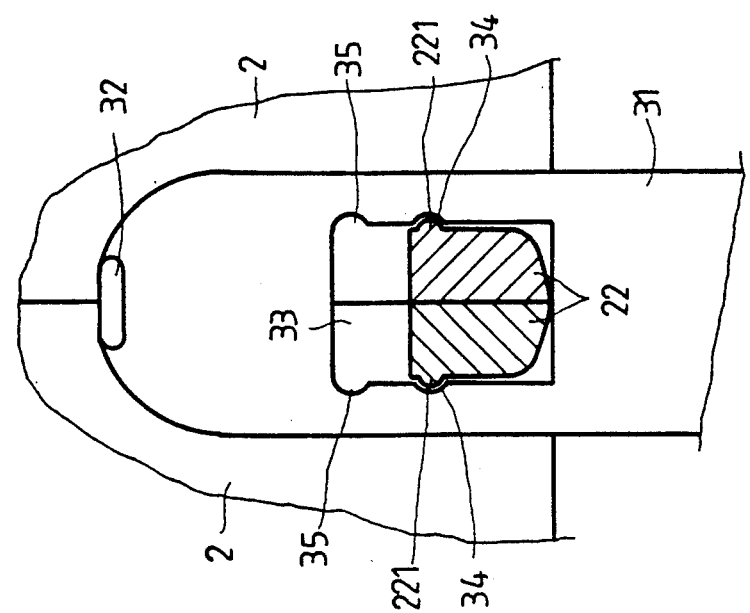
Figure 9:
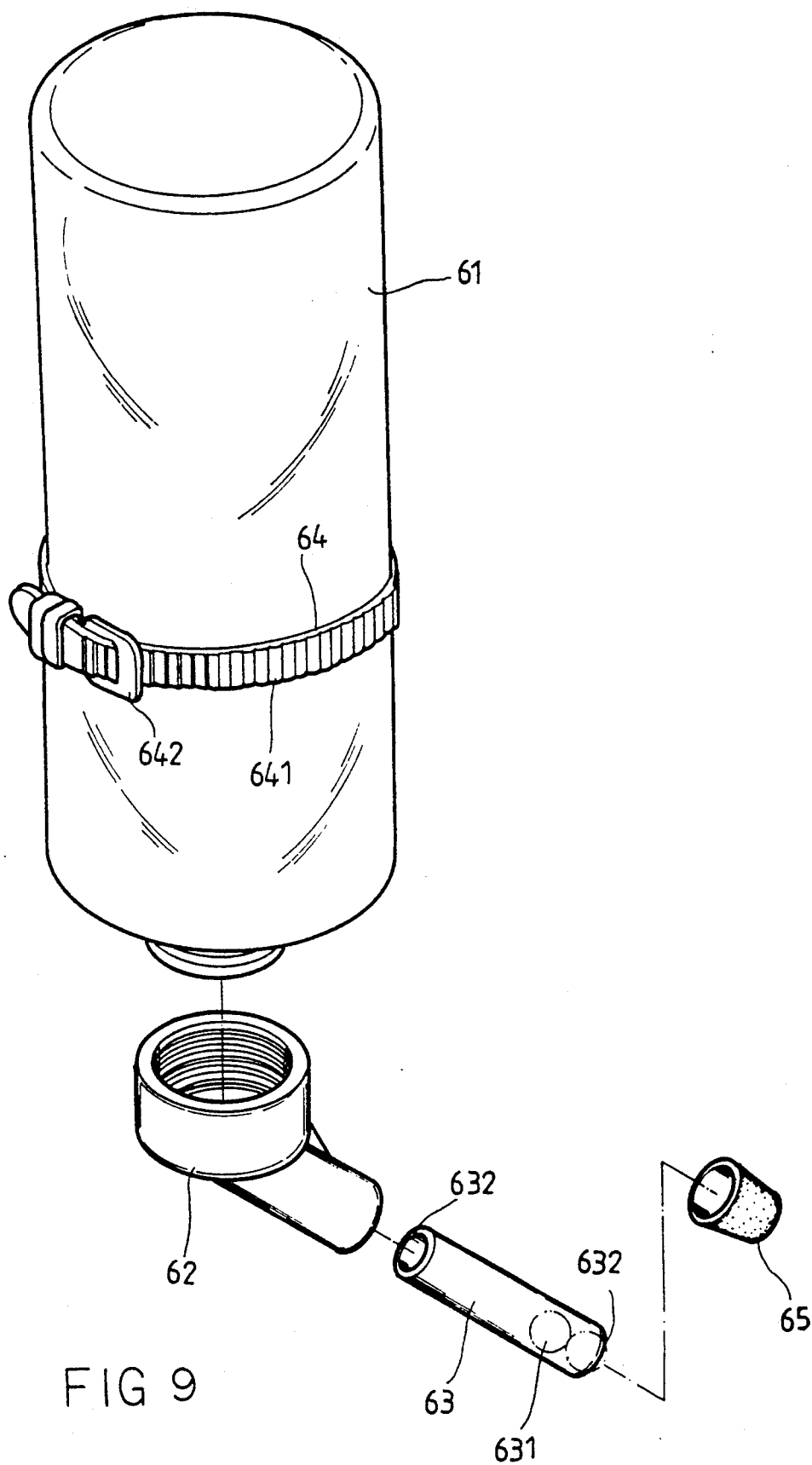
FIG. 9 is a partial exploded view of a feeder.
Figure 10:
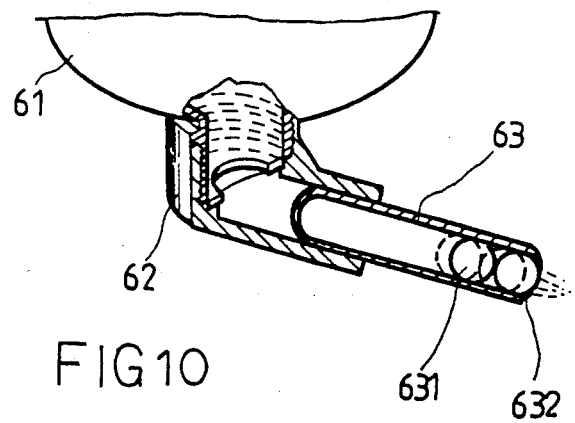
FIG. 10 is a partial cross sectional view of the feeder.
Figure 11:
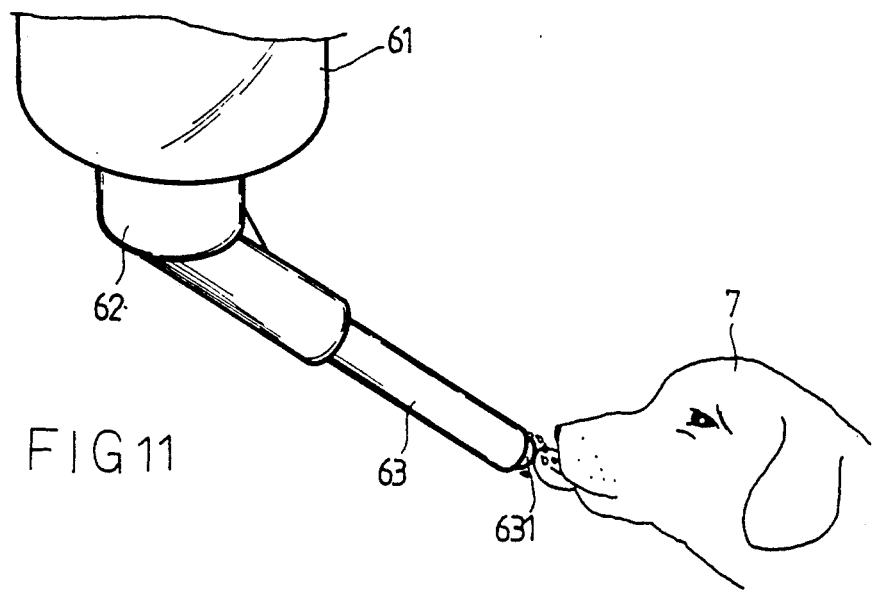
FIGS. 11 and 12 are partial plane views of the feeder.
Figure 12:
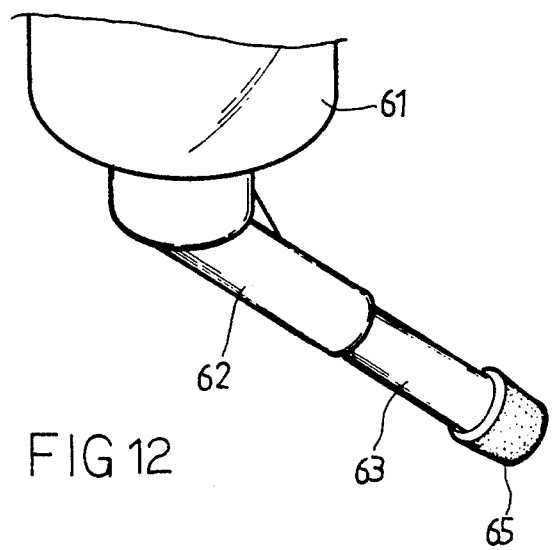

Each of the flaps 2 includes a handle 21 and two lock means 22 provided in the upper portion thereof, one of the lock means 22 includes a projection 227 for engaging with a cavity 228 formed in the other lock means 22 such that the lock means can be prevented from moving upward and downward relative to each other, a ring 23 is provided in the bottom portion of one of the handle 21 and having a number of bulges 231 formed thereon, and a latch 24 formed in the other handle 21 and having a protrusion 241 for engaging within the ring 23, a bolt 5 engaged through the projection 241 of the latch 24 and including a tapered end 51 having a slit 52 formed therein for engaging with a lid 4 so as to lock the handles 21 together, as shown in FIGS. 3 and 4. The bulges 231 are provided to limit the movement of the enlarged head 53 of the bolt 5. Each of the lock means 22 includes a rib 221 formed in the lateral portion and a cap 222 formed in the upper portion thereof. Reinforcing means 211 are provided in the bottom portion of the handles 21 for reinforcing purposes.

Each of the panels 3 includes an ear 31 extended upward therefrom, a lump 32 formed in top of each of the ears 31, a puncture 33 formed in each of the ears 31 for engaging with the lock means 22, two pairs of notches 34, 35 formed in the puncture 33 for engaging with the ribs 221 (FIGS. 5-8) such that the panels 3 can be retained in place.

Figure 13:
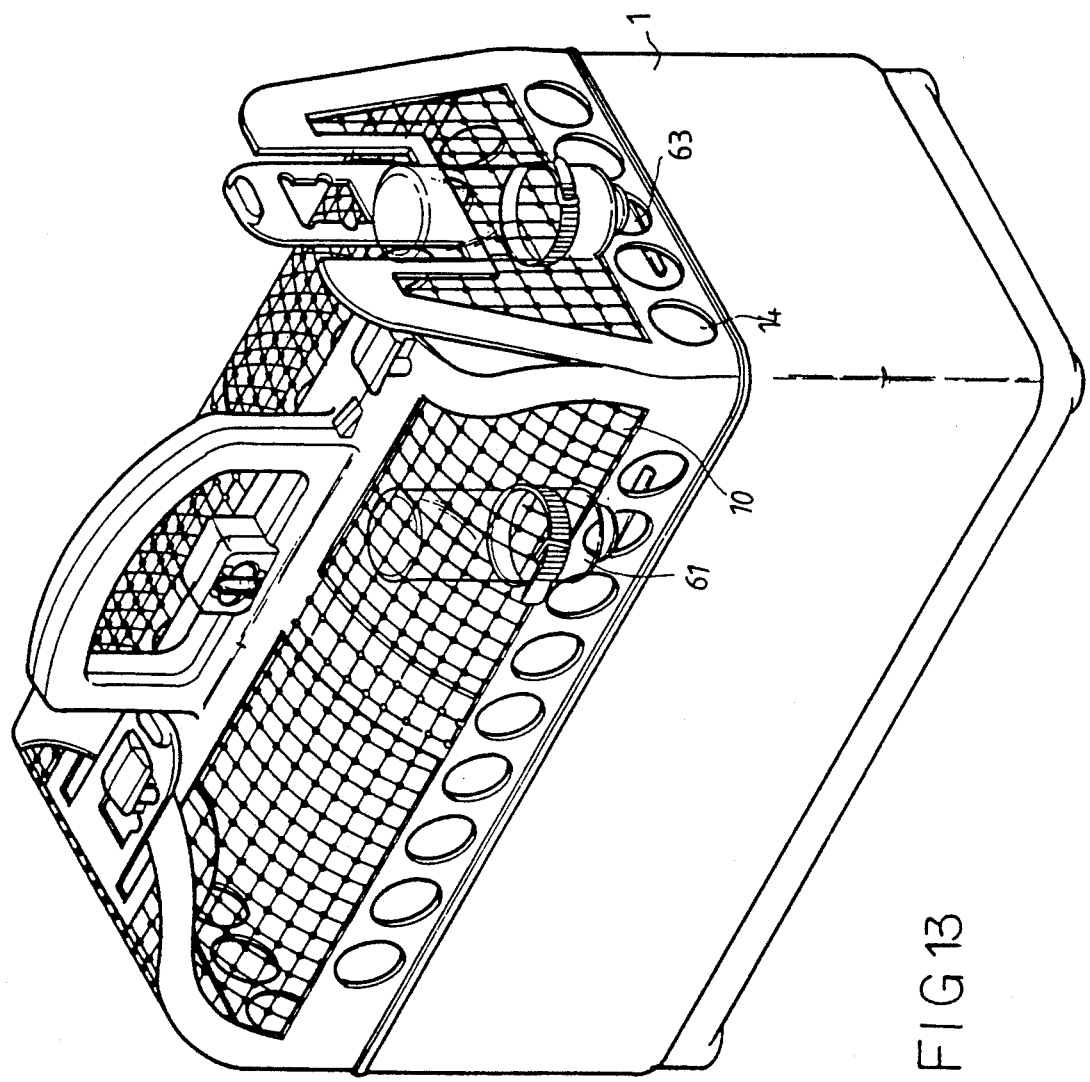
FIG. 13 is a perspective view of the pet house.

Referring next to FIGS. 1 and 9-12, the feeder 61 includes a container having a cap 62 engaged to the bottom portion thereof, an extension 63 coupled to the cap 62 and having at least one ball 631 disposed therein and having a shoulder formed in each of the two ends for preventing the balls 631 from moving out of the extension 63, a cover 65 engaged to the extension 63 for preventing water leaking of the extension 63. A strap 64 having a ring 642 secured to one end and having a plurality of teeth 641 formed on the outer peripheral portion for engaging with the ring 642 so as to clamp the feeder 61 to the pet house. The extension 63 extends inwards of the pet house via the holes 14 such that the pets may drink when they push the balls 631 inwards of the extension 63. As shown in FIG. 13, one or more feeder 61 may be attached to the pet house.

Accordingly, the portable pet house in accordance with the present invention includes a feeder for feeding pets with water and the pet house is suitable for transportation purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A portable pet house comprising a body including a pair of flaps and a pair of panels extended upward therefrom, said body including a hollow interior having four corners, a first rib formed in each of said corners, a shoulder formed in a lower portion of a peripheral portion thereof for engaging with said first ribs of another pet house, said flaps each including a handle and a pair of lock means provided in an upper portion thereof, a ring disposed in a first of said handles of said flaps, a latch disposed in a second of said handles for engaging with said ring, a lid engaged in said latch, a bolt engaged in said ring and said latch and engaged with said lid for coupling said ring and said latch together, said bolt including a tapered end having a slit formed therein for engaging with said lid, each of said lock means including a second rib formed in a lateral portion thereof and a cap formed in an upper portion thereof, each of said panels including an ear extended upward therefrom, a puncture formed in each of said ear for engaging with said lock means respectively, and at least one notch formed in said puncture for engaging with said second rib so as to secure said panels to said flaps.

2. A portable pet house according to claim 1, wherein said latch includes a projection engaged in said ring, said ring includes a number of bulges formed therein distal from said latch, said bolt includes an enlarged head engaged with said bulges such that rotation of said enlarged head of said bolt is limited by said bulges.

3. A portable pet house according to claim 1, wherein a plurality of openings and a plurality of holes formed in each of said flaps and of said panels, a feeder includes an extension secured to a bottom portion thereof and extended inward of said body via either of said holes of said panels, and a fastening means for fastening said feeder to said panel.

4. A portable pet house according to claim 3, wherein said extension of said feeder includes at least one ball disposed therein, and a cover engaged to a free end of said extension for enclosing said extension.

* * * * *